H. H. MYERS.
MILK BOTTLE PROTECTOR.
APPLICATION FILED JUNE 7, 1920.

1,411,868.

Patented Apr. 4, 1922.

Harry H. Myers INVENTOR.

WITNESSES
W. C. Fielding
Frank D. O'Connell

BY
Richard Bowen ATTORNEY.

UNITED STATES PATENT OFFICE.

HARRY H. MYERS, OF MOBILE, ALABAMA.

MILK-BOTTLE PROTECTOR.

1,411,868.     Specification of Letters Patent.     Patented Apr. 4, 1922.

Application filed June 7, 1920. Serial No. 387,118.

*To all whom it may concern:*

Be it known that I, HARRY H. MYERS, a citizen of the United States, residing at Mobile, in the county of Mobile and State of Alabama, have invented certain new and useful Improvements in Milk-Bottle Protectors, of which the following is a specification.

This invention relates to receptacle means adapted to be arranged on the outside of a dwelling so that the dairyman may deposit the milk in the receptacle, container means being provided therein for the milk.

The object of the present invention is to provide a device of the character above described which will enable the delivery and reception of the milk supply to be readily carried on without the necessity of exchanging bottles etc.; it being possible by means of this device to continue using the same container for an indefinite period.

A further object is to provide means whereby the dairyman may deliver the milk in a comparatively quiet and unannoying manner, there being no rattling of bottles to disturb the household; the containers being lodged within the interior of the receptacle and thus free from handling either by the dairyman or any one or from the risk of appropriation by anyone; improved funnel means being provided to enable the milk to be poured into the container directly from the dairyman's measuring cup.

With the above and other objects in view, the invention may be said to reside generally in the details of construction, arrangement and combination of parts as will be hereinafter more fully pointed out, reference being had to the accompanying drawings, wherein—

Figure 1:
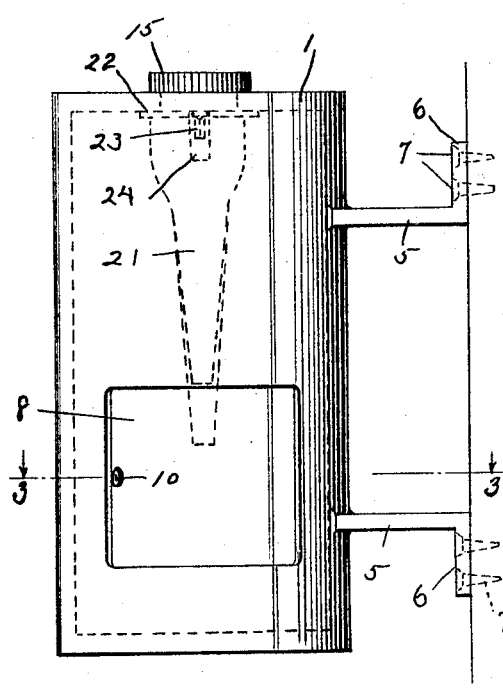
Figure 1 is a side elevation of the invention.

As disclosed in the drawing, this receptacle is preferably constructed of two casings, an outer casing 1 and an inner casing 2, spaced apart as shown and by connecting ribs 3, the latter defining spaces filled in with sawdust or other material indicated at 4 which may tend to prevent freezing of the milk bottle during cold weather. The double-casing receptacle thus provided may be either cylindrical in shape or any other form desired and is adapted to be secured to the outside of the house by means of bracket arms 5 having the angle ends 6 provided with a number of holes for the reception of fastening elements 7 as indicated by the dotted lines in Figure 1. The brackets are in vertically spaced relation to one another and may be fastened to the side of the door post, the porch or any other suitable place on the outside of the house. Access to the interior of the receptacle is afforded by means of a sliding door 8 opening through the side of the receptacle and positioned for sliding movement between the inner and outer casings; the ribs 3' and 3" being square constituting the guides between which the door is supported, a run-way 9 being provided on one side of the door-opening to receive the door when slid back. A knob 10 and a suitable locking mechanism 11 may be arranged upon the inside of the door and receptacle to permit the owner to lock the receptacle after the milk bottles have been deposited therein. With respect to this feature, it may be here pointed out that two unlocking keys may be provided, one in the possession of the owner and the other one in possession of the milk man so that either may be able to open the receptacle and to place in or remove the milk container as required in which case it may be obvious that whenever it does become necessary to effect any change of bottles, they can all be locked in the receptacle and thus protected against breakage or theft.

The two close casings are connected together at their upper ends as indicated at 12 through which connection is formed an inlet opening 13 through which the milk or other fluid is adapted to be poured, this opening being threaded and when not in use, closed by a plug 14 which is screwed therein, this plug being provided with an enlarged, overlapping head 15, which completely covers the top of the opening and prevents any dust or other foreign matter from passing into the receptacle. In order that the fluid passed through the opening 13 may be properly received and conducted to the proper container, funnel means 16 is provided within the receptacle and consists in a cupped-shaped vessel 17 open at the top and flanged for attachment to the top wall of the inner casing 2 from which it depends; the vessel surrounding the inlet opening so as to receive the liquid poured therethrough. The bottom of the vessel is provided with two or more outlet openings 18 over each of which is arranged a screen or strainer 19 so that the milk or cream discharged therethrough may be strained. Each strainer and outlet is spaced off from the other with a rib 20 formed in the bottom of the vessel for the purpose of flanging each discharge opening so that it may be more readily located by the spout of the milk man's funnel, the lower end of which is adapted, when placed over any one particular outlet to fit inwardly over the flange, as clearly shown by the dotted lines of the funnel shown in Figure 2. Formed integral with the vessel 16 are a number of discharge spouts 21, corresponding in number to the outlets 18, there being one spout to each outlet. The spouts of the funnel are adapted to project below the strainer bottom of the vessel and may be of any desired curve or form, it merely being essential that they provide an efficient and durable conduit for carrying the fluid from the vessel into the containers housed within the receptacle. The spouts should, preferably, be of unequal and varying length so that the funnel may be adapted for filling containers of varying heights and capacity as well as those that are uniform. In the drawings, this is illustrated by showing the right hand spout which is used for filling pint bottles, to be longer than the left hand spout which fills the quart bottles, it being noted that, in each instance the terminal of the spout is in close proximity to the mouth of the bottle so that the liquid is discharged directly into the container without spilling.

Additional closure means for the opening 13 is provided in the form of a disk 22 which covers the opening from the under side, being hinged to the top wall of the inner casing adjacent the edge of the opening. It is thus entirely embraced by the vessel 16 of the funnel into which it is adapted to swing when depressed by the insertion of the end of the finger or the end of the funnel spout through the opening. This spout is normally retained in closed position by means of a spring 23 fastened to the top wall of the inner casing on the outside of the vessel 16; a slot 24 being formed in the wall of the latter to permit the spring finger 25 to project interiorly thereof for pressing against the cap. It is to be noted that when the plug 14 is screwed in place that its lower end lies flush with the inner edge of the opening 13 and that the disk is thus permitted to fit squarely up against the opening, the head of the plug on the one side and the disk on the other side, together with the threaded shank, conjunctively tending to seal the opening and excluding all foreign matter from the interior of the receptacle.

Figure 2:
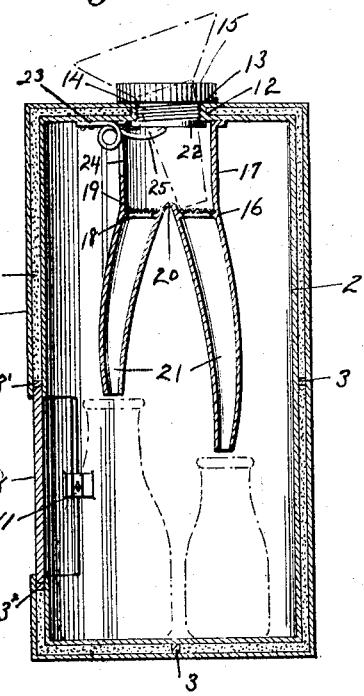
Figure 2 is a vertical transverse section of the same.
Figure 3:
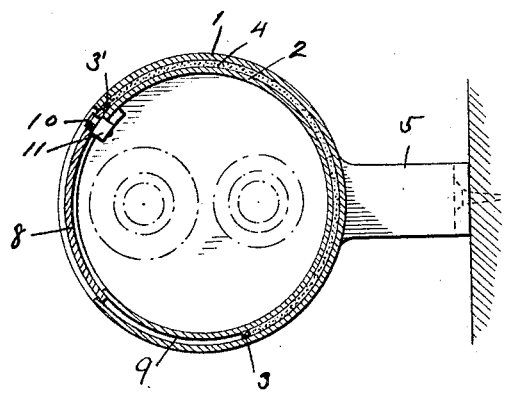
Figure 3 is a cross section taken on line 3—3 of Figure 1.

In operation, the milk retainers such as the bottles indicated in dotted lines in Figure 2 are inserted through the door of the receptacle and positioned beneath the discharge spout of the funnel means, subsequent to which the door may be locked for preventing removal or disarrangement of the container. The receptacle is thus ready for the delivery of the milk by the dairyman and this is accomplished by the removal of the plug from the inlet opening which reveals the under dust-cap or closure disk 22 which however, being hinged, is depressible for the insertion of the spout end of the funnel used by the milk man, this funnel being inserted through the opening and positioned as indicated in the dotted lines of Figure 2, the discharge end of the spout being successively placed over the outlets to the spouts, below which containers have been arranged, it being possible by means of the view to be had through the opening prior to the insertion of the funnel therethrough, to ascertain how much milk the customer may require, this intention being manifested by the manner in which the containers are arranged, it being obvious that no milk would be poured into any discharge spout not having a container arranged therebeneath. After the filling operation has been completed and the funnel withdrawn from the opening, the plug 14 may be screwed back into place, to close the opening, the disk cap automatically returning to close the under side of the opening promptly upon withdrawal of the milk man's funnel therethrough.

From the foregoing description, it is believed that the advantages and usefulness of the invention can be very readily appreciated and understood and in conclusion it need only be stated that the present description and illustration embodies only a single embodiment of the invention and that various changes in the details of construction, arrangement and proportionment of parts, etc., may be resorted to as fall within the scope of the invention as claimed.

Having thus described the invention what I claim as new and desire to secure by Letters Patent is:—

In a receptacle container of the class described the combination with an outer casing, of an inner casing, said casings held in spaced relation by means of ribs, an access opening formed in said casings, a door sliding between said casings for closing said opening, an intake opening in the upper end of said casings, a plug for closing said intake opening, a cup-shaped vessel fixed to the inner casing having two discharge spouts, a rib formed in said vessel between said spouts, a disk for closing said intake opening located in said vessel, and a spring for holding said disk against said inner casing, whereby closing said opening, as and in the manner set forth.

In testimony whereof I affix my signature in presence of two witnesses.

HARRY H. MYERS.

Witnesses:
Jos. F. Bullock,
W. G. Horn.